United States Patent
Schweitzer et al.

(10) Patent No.: US 7,125,524 B2
(45) Date of Patent: Oct. 24, 2006

(54) DEVICE AND METHOD FOR OPTIMISING THE CIRCULATION OF A SUSPENSION IN A PLANT COMPRISING A THREE-PHASE REACTOR

(75) Inventors: Jean-Marc Schweitzer, Villette de Vienne (FR); Eric Lenglet, Rueil Malmaison (FR); Franck Gaviot-Blanc, Vienne (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 19 days.

(21) Appl. No.: 10/481,818

(22) PCT Filed: Jun. 5, 2002

(86) PCT No.: PCT/FR02/01919

§ 371 (c)(1),
(2), (4) Date: Aug. 4, 2004

(87) PCT Pub. No.: WO03/002246

PCT Pub. Date: Jan. 9, 2003

(65) Prior Publication Data

US 2004/0258579 A1    Dec. 23, 2004

(30) Foreign Application Priority Data

Jun. 25, 2001   (FR) .................... 01 08442

(51) Int. Cl.
*B01J 8/18* (2006.01)
*C07C 27/00* (2006.01)

(52) U.S. Cl. .................. 422/139; 518/700; 518/705

(58) Field of Classification Search ................ 422/190; 218/788; 518/700, 705; 502/20, 21
See application file for complete search history.

(56) References Cited

U.S. PATENT DOCUMENTS 3,546,296 A    12/1970   Gobron et al.
5,770,629 A *  6/1998   Degeorge et al. ........... 518/700
5,900,159 A *  5/1999   Engel et al. ................ 210/788

FOREIGN PATENT DOCUMENTS

EP   0 952 132    10/1999
FR   1 038 608    9/1953

* cited by examiner

*Primary Examiner*—Glenn Caidarola
*Assistant Examiner*—Tom P. Duong
(74) *Attorney, Agent, or Firm*—Millen, White, Zelano, Branigan, P.C.

(57) ABSTRACT

To facilitate operation of a facility for chemical conversion of a feed that comprises a reactor (2) containing a slurry constituted by at least one suspension of at least one solid in a liquid, a gas supply, and a circuit that is external of the reactor, for continuous movement of a slurry stream, wherein the external circuit withdraws slurry from the reactor from at least one point (A) and re-introduces at least a portion of the slurry at at least one other point (B), the facility is further provided with

- means for stopping circulation of the slurry in the circuit;
- means for pressurized introduction of at least one fluid for draining the slurry contained in the circuit; and
- means for circulating the slurry in the external circuit under conditions such that the Reynolds number is more than 2500.

24 Claims, 1 Drawing Sheet

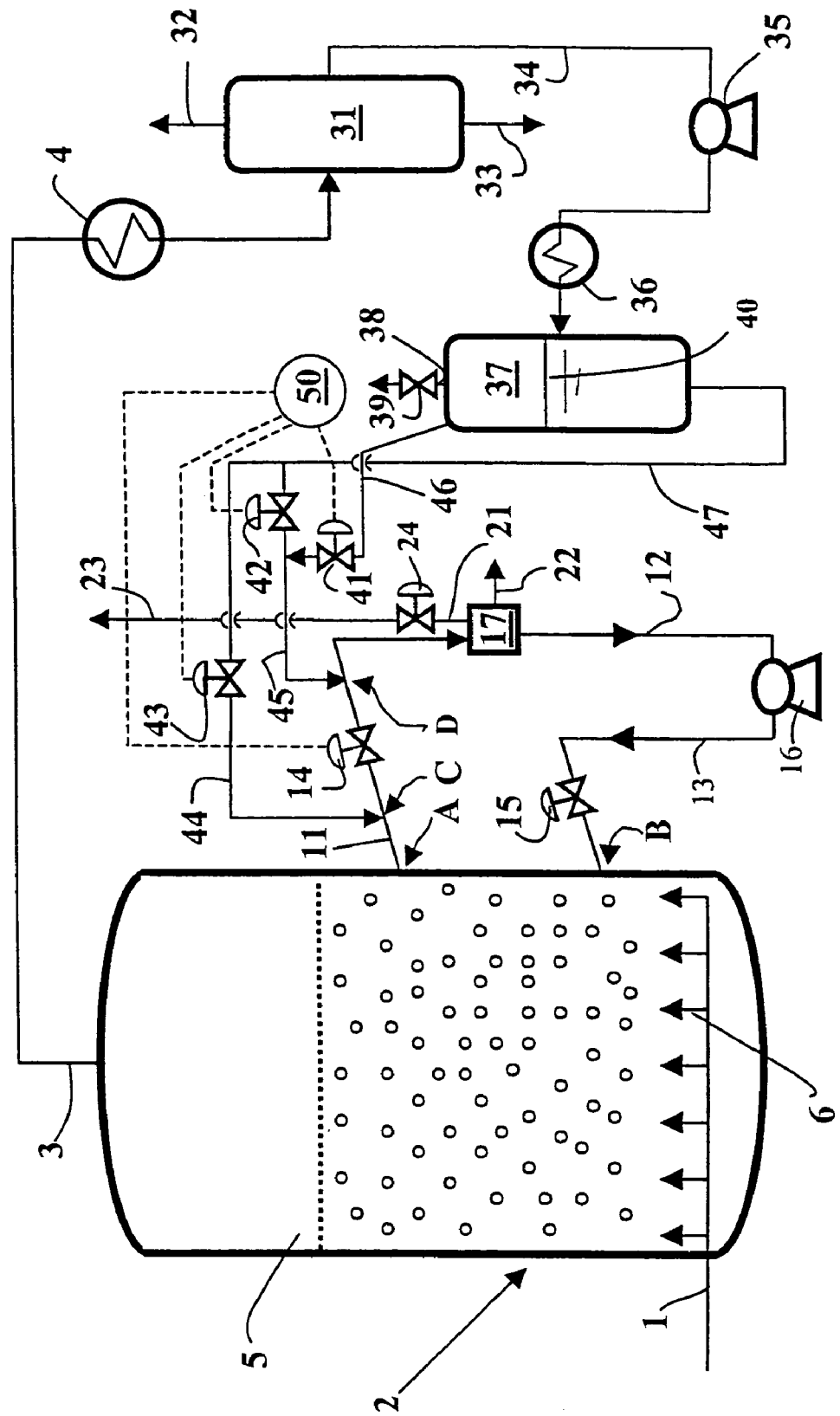

DEVICE AND METHOD FOR OPTIMISING THE CIRCULATION OF A SUSPENSION IN A PLANT COMPRISING A THREE-PHASE REACTOR

The present invention relates to an apparatus and a process for chemical conversion of a feed, for example hydrocarbons, in a three-phase reactor also known as a "slurry" reactor. The term "slurry" as used by the skilled person generally designates a suspension of solid particles in a liquid, for example a suspension of fine particles with a mean diameter that is generally about 200 micrometers or less, at a concentration by weight of solid in the liquid that is usually in the range 0.1% to about 70%. The term "slurry" as used in the present invention also designates a mixture of a suspension as described above, also comprising a gas phase, i.e., a divided solid/liquid/gas three-phase mixture. The reagents taking part in the chemical reaction can be contained in the gas phase, in the liquid phase, in the solid phase or even in a plurality of those phases without transgressing the scope of the invention. Said solid phase can also be a reaction catalyst.

Particular processes using a slurry reactor (three-phase) that can be cited are certain processes for converting and/or desulphurising residual heavy hydrocarbons or certain aliphatic oxidation or alkylation processes. Clearly, such processes do not limit either slurry reactions or the field of application of the invention.

One of the major technical problems in slurry reactor processes is avoiding decantation of the solid or gradual clogging, which can result in blockages in different parts of the facility. More particularly, using a slurry process poses major problems connected with transport of the slurry in the lines.

Curative means are already known that can limit the deposits or clean the lines by circulating a cleaning liquid.

Such means have been described, for example, in United States patents U.S. Pat. No. 4,526,764 and U.S. Pat. No. 4,123,601.

The Applicant has surprisingly discovered that circulation of slurry under the particular conditions of the invention can avoid and prevent the onset of the clogging phenomenon in the slurry transport lines. A minimum slurry circulation velocity must be guaranteed to avoid sedimentation problems in the lines, which could lead to a blockage. Too low a slurry circulation velocity causes the solid to be deposited in horizontal or slightly inclined lines by sedimentation of the solid, leading to gradual obstruction thereof. When, for example, there are a plurality of circuits that are external to the reactor, it may be possible to move from one circuit to another. In that case, some slurry lines are not longer traversed by slurry. The solid contained in those lines sediments out, causing complete blockage of the circuit and to shutdown. Thus, it is impossible to re-use that circuit without first cleaning and freeing it. In a further example, when a slurry recirculation pump is shut down, the lines have to be rinsed with a fluid to remove the solid deposited in those lines after the pump is stopped.

The present invention concerns an apparatus and an associated process used in a facility employing a slurry reactor and with increased reliability as regards the risk of deposition of solids and blockage of different parts of the facility compared with prior art devices. The invention advantageously avoids the onset of the phenomenon of deposition of solid particles contained in the slurry, for example in the event of malfunction of the facility or when it is deliberately shut down.

A further aim of the invention is to substantially reduce maintenance costs linked to deposition of solid in a slurry reactor.

To this end, the Applicant studied an experimental facility with different programs of slurry circulation in the reactor and in an external slurry circulation loop, used to carry out liquid/solid separation and to recover the liquid produced by the chemical reaction.

To this end, the Applicant studied an experimental facility with different programmes of slurry circulation in the reactor and in an external slurry circulation loop, used to carry out liquid/solid separation and to recover the liquid produced by the chemical reaction.

Surprisingly, it was discovered that the risk of solid deposition is lower in the reactor than in the external loop. When the reactor is operating normally, the suspension is kept stirred because of the superficial velocity of the gas $V_g$ and sometimes by the use, in addition to the gas effect, of a rising superficial liquid velocity. The conditions for producing a stable suspension are known in the art. Such conditions can avoid deposition of solid above the level at which the gas is injected into the reactor. By testing different conditions with the onset of solid decantation, the Applicant found that during the onset of decantation, a substantially homogeneous suspension can generally be restored by increasing the superficial velocity of the gas by the simple expedient of injecting gas at a plurality of points.

In contrast, the Applicant discovered that the onset of solid deposition in external circulation lines was difficult to eliminate simply by increasing the slurry circulation rate. Thus, it is more difficult to restore the optimal operating conditions, i.e., an absence of deposition, for the external lines. Further, it has been discovered that the onset of deposition encourages subsequent deposition, aggravating the clogging process.

Further, the Applicant has surprisingly discovered that there is a correlation between the problems encountered and operational perturbations, in particular during shutdown, however short.

Thus, the invention proposes a device that does not limit or eliminate deposition but mostly or completely prevents the onset of the deposition process, which process accelerates once initiated.

Preferably, the invention also provides an apparatus with optimised reliability that can avoid the initiation of the deposition process even in the event of non-availability of facility operators. This automated apparatus avoids the risk of mishandling, and limits the number of staff required to operate the facility properly.

To clean the lines of the external circuit effectively, in accordance with the invention, the following steps must be carried out:

starting to rinse prior to deposition of a substantial fraction of the solid in the line, preferably prior to the onset of sedimentation of the solid in the line; if there are a plurality of lines in the external circuit, an automatic rinsing system is required;

providing a rinsing liquid rate that is at least higher than a minimum velocity to allow the solid particles in the horizontal or slightly inclined lines of the external circuit or circuits to move into suspension; the volume of injected rinsing liquid is advantageously at least twice the volume of the rinse line to ensure proper rinsing efficiency;

using a rinsing liquid that does not interact with the catalyst to cause its deterioration and thus its deactivation;

preferably, using a rinsing liquid with a freezing point that is equal to or less than that of the liquid fraction of the slurry and generally less than ambient temperature to avoid said problems in the event of shutdown of the facility.

In its most general form, the invention concerns a facility for chemically converting a feed, comprising at least one reactor containing a slurry constituted by at least one suspension of at least one solid in a liquid, a gas supply located in the lower portion of said reactor, a circuit that is external to the reactor, with continuous circulation of a slurry stream, said slurry being withdrawn from at least one point (A) and at least a portion of which is re-introduced at at least one other point (B) of said reactor, a section for separating at least one fluid contained in the slurry stream traversing said external circuit, said facility being characterized in that it further comprises:

means for stopping the circulation of said slurry in said circuit;
means for pressurised introduction of at least one fluid for draining the slurry contained in the circuit from at least one point (D) of said circuit;
means for circulating the slurry in said external circuit under conditions such that the Reynolds number is more than 2500 at every point in said circuit.

Preferably, said introduction point or points is/are placed in said circuit between said means for stopping circulation of the slurry and said separation section.

In a first embodiment of the invention, at least one of said draining fluids is a pressurised gas.

In a further embodiment of the invention, which can be in combination with the previous embodiment, at least one of said draining fluids is a pressurised liquid.

In general, said means for stopping circulation and draining said slurry comprise:

at least one block valve disposed in said circuit;
means for bringing at least one introduction point (D) of the circuit into communication with a source of at least one fluid pressurised to a pressure higher than that of point (D), said fluid being substantially free of solid in suspension;
a free volume in the upper portion of the reactor above the liquid/solid suspension, said volume being greater than the volume of the liquid/solid suspension contained in the circuit and in the separation section.

Advantageously, said facility comprises means for detecting at least one operational defect in said facility connected to means for controlling closure of the block valve and for opening at least one valve placing said circuit into communication with said source of pressurised fluid.

Typically, said reactor also comprises:
means for injecting said reactive gas at a plurality of points;
means for suspending and stirring the slurry in the reactor, of a size to avoid deposition of solid in the reactor above the gas injection points.

In a preferred embodiment of the invention, said means for circulating slurry in said external circuit are of a size so that said Reynolds number of the slurry is in the range 2500 to 500000 at every point in said external circuit.

Advantageously, said facility further comprises means for condensing at least a portion of the gaseous effluent from said reactor (2), means (37) for storing at least a portion of the condensed effluent, said storage means (37) being connected to means for introducing the draining fluids into said circuit.

Most frequently, said solid in suspension is a reaction catalyst, and said pressurised fluid is a fluid that is chemically compatible with the catalyst.

The present invention also concerns a process that can be carried out by the facility in which a draining fluid is used at least partially comprising at least a fraction of at least one of the reaction fluids.

Still within the context of the invention, said draining fluid can comprise, alternatively or in combination, at least one fluid selected from the group formed by nitrogen, hydrogen, carbon monoxide, liquid or vaporised hydrocarbons principally comprising compounds containing less than 20 carbon atoms, and mixtures formed completely or partially from said different fluids.

In general, the freezing point of said draining fluid is lower than that of the liquid phase contained in the slurry and/or below ambient temperature.

The facility and/or process described above are applicable, for example, to processes for conversion or desulphurisation of residual heavy hydrocarbons, to aliphatic alkylation processes, to oxidation processes.

BRIEF DESCRIPTION OF THE DRAWING

The invention will be better understood from the following description, illustrated in FIG. 1, showing a portion of a chemical conversion facility incorporating a reactor and comprising a slurry as defined above.

DETAILED DESCRIPTION OF THE DRAWING

FIG. 1 shows a slurry reactor (2) comprising a line (1) in its lower portion for supplying a reactant gas, injected into a reactor (2) at a plurality of points (6). In the upper portion of the reactor (2) is a zone (5) for an essentially gaseous phase, located above the slurry. Said slurry is in a three-phase form and in the form of a continuous phase constituted by a liquid/solid suspension traversed by gas bubbles.

At the head of the reactor (2), a line (3) evacuates the gaseous effluents from the reaction, comprising gases that have not been converted and gaseous reaction products. The gaseous effluents traverse a cooling exchanger (4), with cooling causing condensation of a portion of the heaviest compounds that are separated in a separating drum (31). This drum can separate a gas phase evacuated via a line (32) from a first liquid phase, for example water, evacuated via a line (33), and from a second liquid phase, for example the hydrocarbons produced by the reaction. Said hydrocarbons are then evacuated via a line (34). This last liquid phase is pumped using a means (35) then is reheated in a heat exchanger (36) under conditions that allow partial vaporisation of said phase, which is subsequently fractionated in a separator drum (37). The gas phase arriving in drum (37) is evacuated via a line (38) on which a pressure regulating valve (39) is mounted, but it can also be evacuated via a line (46) comprising an automatically operated valve (41). The liquid phase, stored in the lower portion (40) of the drum (37), is evacuated via a line (47) which divides into two lines: a line (44) on which an automatically operated valve (43) is mounted and a line (45) on which an automatically operated valve (42) is mounted. Said lines (44) and (45) are connected to a slurry circulating circuit, external to the reactor (2). Said circuit comprises a line (11) starting from a point (A) for withdrawing slurry from the reactor. Line (11) comprises an automatically operated block valve (14), and two points (C) and (D) for connecting respectively to lines (44) and (45), which are lines for circulating pressurised fluid originating from drum (37). Line (11) is connected to a separation zone (17). The gas contained in the slurry is separated in said zone (17) and evacuated via line (23) on which an automatically operated valve (24) is mounted. Zone (17) can also advantageously separate a fraction of the liquid contained in the slurry, said fraction then being evacuated via a line (22). The residual slurry, free of substantially all of the gas and a portion of the component liquid, is evacuated form zone (17) via a line (12), pumped via a means (16) such as a re-circulating pump, and sent to a line (13) on which an automatically operated valve (15) is mounted. Said residual slurry is then re-introduced into the reactor at a point (B) into a zone that is preferably located in a lower portion of the reactor and upstream of point (A). In this case, the slurry recycled to point (B) creates an upward movement of slurry in the reactor between points (B) and (A).

In the present description, the term "slurry stream" will be used indiscriminately to describe the three-phase stream of slurry withdrawn from the reactor at point (A) or the stream of slurry that has been degassed and concentrated by separating a portion of the liquid leaving zone (17) and circulating in lines (12) and (13). Separation zone (17) can in particular comprise means for gas/liquid or gas/liquid and solid separation, for example a gas separator drum, and liquid/solid separation means, for example a decanter, a hydrocyclone or a filter. The flow chart for zone (17), which is not a feature of the invention, will not be explained in detail. As usual, said zone generally comprises one or more spaces containing slurry, integrated into which is one or more of the means mentioned above.

The facility also preferably comprises automatic control means such as a programmable controller(50) connected to the block valve (14) and to valves (41), (42) and (43). Advantageously, controller(50) can also be connected to valve (15) and to valve (24) via means that are not shown, and to means with no reference numerals for detecting faults in the operation of the facility.

The facility comprises at least one slurry type reactor (2) operating under pressure that can be varied depending on the chemical reaction and/or the desired process, but typically in the range 1 to 5 MPa (megapascals), for example about 2 MPa. Said reactor comprises a divided solid that can optionally but not necessarily be a catalyst. The reactant gas mixture is introduced into line (1) and distributed in the slurry at a plurality of injection points (6). The number of injection points is at least 2 points per square meter of horizontal block of the reactor, preferably in the range 4 to 400 points per square meter of reactor, for example about 20 points per square meter.

In accordance with the invention, the reactor is stirred sufficiently to substantially prevent any deposition of solid above the gas injection points. In general, a superficial gas velocity $V_g$ is used that is sufficient to obtain turbulent flow and not laminar flow, this velocity being readily determined in the laboratory.

For a slurry with an average granulometry of less than 100 micrometers, for example, it is also possible to use a superficial gas velocity $V_g$ in the range 0.12 to 0.50 m/s, preferably in the range 0.12 to 0.35 m/s, the upflowing superficial liquid velocity between points (B) and (A) of the reactor usually being greater than the decantation rate of the solid, and generally in the range about 0.001 to about 0.15 m/s, typically about 0.02 m/s. Said decantation rate is calculated using standard rules, or it is measured in the laboratory.

Under these conditions, the slurry is sufficiently stirred to avoid substantial deposit of solid particles above the gas injection points (6).

In one embodiment described with respect to FIG. 1, a stream of slurry is circulated in the external circuit from point (A) to point (B) via lines (11), (12), (13), the quantity of slurry re-introduced into the reactor at point (B) producing a superficial velocity of liquid $V_L$ into the reactor.

The above conditions can also restore the correct suspension in the reactor, after solid particles start to decant in the reactor, by increasing velocities $V_G$ and/or $V_L$.

A portion of the liquid circulating in the external stream is separated in a separation zone (17) comprising a filter or a decanter, to keep the slurry level in the reactor constant.

In accordance with the invention, pump (16) circulates the slurry in different lines of the circuit (11, 12, 13) with a sufficient velocity in each line so that the Reynolds number, defined as $$Re=\rho VD/\mu$$

in which:

ρ: density of slurry circulating in said line;

V: velocity of said slurry (calculated, for example, by assuming that the gas velocity is identical to that of the suspension, in the particular case of a three-phase slurry);

$D_H$: hydraulic diameter of the line;

μ: viscosity of the slurry (typically, the single viscosity of the liquid/solid suspension, continuous phase);

is more than 2000, in particular more than 2500 and even 3000. As an example, a Reynolds number can be selected that is in the range from about 3000 to about 500000, for example close to 20000. The rate of circulation of the slurry is preferably more than 0.30 n/s, for example in the range 0.5 to 2 m/s. Preferably, the facility also comprises means for detecting at least one operational fault. This fault may be connected with the reactor, for example too high a temperature, or an abnormal level of slurry in the reactor (2). In accordance with the invention, said means can also monitor faults in the operation of equipment external to the reactor, more particularly equipment in the separation zone (17): gas/solid and liquid separator drum, decanter, filter, hydrocyclone, recirculation pump (16), etc . . .

In this case, in accordance with the invention, a series of associated means is provided for draining the external circuit immediately, i.e., for evacuating the slurry contained in lines (11), (12) and (13) and in separation section (17), and for transferring this slurry to the reactor. When the fault is detected, for example a fault in the operation of the separation section, the programmable controller (50) starts a procedure for draining the solution contained in the external circuit (11, 12, 13) before any substantial amount of slurry has been deposited in the circuit, preferably before any solid particles have sedimented out from the slurry. In accordance with the invention, this avoids long term clogging of the circuit, the solid then tending to adhere to the internal walls, facilitating subsequent clogging.

The preferred procedure for draining the circuit is an automated procedure controlled by the programmable controller (50). This procedure comprises automatic closure of valves (14) and (24), said closure causing recirculation of slurry in circuit (11, 12, 13) to stop and the release of gas via line (23). The controller then automatically opens at least one valve (41), (42) or (43), which places the circuit in communication with a "clean" pressurised fluid, i.e., free of solid, said fluid displacing the slurry from the external circuit.

Preferably, the circuit is firstly placed in communication with a source of pressurised gas by opening the automatically operated valve (41) connected to the volume of gas contained in the upper portion of the drum (37). Alternatively, it is also possible to use, without departing from the scope of the invention, a further source of gas, for example methane, reactor supply gas, or nitrogen. The pressure of the gas source employed is advantageously greater than at least 0.02 MPa at the pressure for introducing gas into the circuit, i.e., at point. (D). Preferably, in accordance with the invention, a pressurised gas is used that is at a pressure that is greater than the pressure of the circuit by at least 0.1 MPa, preferably more than about 0.3 MPa.

The pressure differential between the gas source and the circuit is sufficient to force the slurry through the lines of the circuit with a local Reynolds number of more than 2500 at each point in the circuit (11, 12, 13) in the range 3000 to 500000 and preferably more than 2500. In accordance with the invention, the Reynolds number can nevertheless be less than 2500, for example less than 2000 in the space or spaces included in the separation section (17), these advantageously having walls that are typically inclined by at least 60° to the horizontal.

Points (C) and (D) are preferably sufficiently close to valve (14) for at least 80%, preferably at least 90% and more preferably more than 97% of the horizontal or slightly inclined portions of the circuit (11, 12, 13) to be flushed.

The circuit is generally drained rapidly, so it is possible within the context of the invention to have a Reynolds number that is lower than that used during normal operation of the facility; however, it is preferable to build in safety margins and use Reynolds numbers that can vary along lines (11, 12, 13) but are in particular in the range 2500 to 500000, advantageously more than 10000, both during normal operation and in the event of shutdown of the facility. In accordance with the invention, closing the circuit using valve (14) and introducing pressurised gas between valve (14) and separation section (17) (which includes at least one space as defined above) via a line (45) can displace the slurry contained in said space or spaces downstream of the circuit and re-introduce it into the reactor at point (B). The duration of pressurised gas injection will be selected by the skilled person to displace the major portion of the slurry contained in the circuit, including separation section (17). The terms "upstream" and "downstream" are defined in the present description with respect to the normal slurry circulation direction, both in the reactor and in the external circuit.

After this gas injection, controller (50) then opens automatically operated valve (42), to place the portion of the circuit downstream of valve (14) into communication with a clean liquid and at a pressure that is higher than that present in said circuit, with a pressure differential that is, for example, similar to that previously described for the gas. This liquid will be displaced with a "piston" effect that is greater than that of the residual slurry possibly remaining in the lines of said circuit. In accordance with the invention, it has surprisingly been discovered by the Applicant that a liquid is more effective at draining slurry from the lines, while a gas is more effective for draining spaces such as those included in separation section (17). A combination of a gas and a liquid introduced simultaneously or preferentially one after the other (gas plus liquid) is thus preferred in the invention for carrying out said draining.

After this gas injection, controller (5) then opens automatically operated valve (42), to place the portion of the circuit downstream of valve (14) into communication with a clean liquid and at a pressure that is higher than that present in said circuit, with a pressure differential that is, for example, similar to that previously described for the gas. This liquid will be displaced with a "piston" effect that is greater than that of the residual slurry possibly remaining in the lines of said circuit. In accordance with the invention, it has surprisingly been discovered by the Applicant that a liquid is more effective at draining slurry from the lines, while a gas is more effective for draining spaces such as those included in separation section (17). A combination of a gas and a liquid introduced simultaneously or preferentially one after the other (gas plus liquid) is thus preferred in the invention for carrying out said draining.

In a preferred embodiment of the invention, the block valve (14) located on the external slurry circuit of the reactor is used upstream of a space included in a separation zone (17) and means for introducing a fluid under a pressure that is higher than that of said circuit, said introduction being carried out at a point located between said valve (14) and said space.

It is also possible, from commencing the draining procedure or after closing valve (14), to open the automatically operated valve (43) to drain the upstream portion of the circuit. Preferably, pump (16) is stopped when the procedure is commenced.

In FIG. 1, the pressurised liquid contained in the lower portion (40) of drum (37) is obtained by condensing the gas from the reactor after passage through exchanger (4). Said gas principally contains the lightest products produced in the reaction, in particular those containing essentially less than 20 carbon atoms. The hydrocarbons are condensed in drum (31) at a temperature of about 50° C., pumped by means (35), then re-heated and partially vaporised in exchanger (36) to produce both a source of gas and a source of a liquid, at a pressure that is higher than that of the slurry circulation circuit. To increase the available gas flow, it is also possible to add nitrogen or methane or a supply gas to reactor (2). These pressurised fluid sources are, clearly, chemically compatible with the catalyst. It is important-not to use fluids that can deactivate the catalyst.

In a preferred embodiment of the invention, in the process described above, the major portion of the slurry contained in the circuit is firstly purged by the pressurised gas, for example by introducing via point (D) a volume of gas comprising, for example, between 1 and 5 times the volume of the liquid/solid suspension contained in the circuit, preferably between 1 and 3 times said volume. Then the residual slurry is purged by introducing via point (D) a volume of pressurised liquid, for example in the range 0.5 to 3 times the volume of the liquid/solid suspension initially contained in the circuit, preferably between 0.5 and 1.5 times said volume. At the same time as the circuit is purged via point (D), using the same pressurised fluids (liquid and gas), the upstream portion of the circuit is purged via point (C), by circulating pressurised liquid in line (44). The slurry contained in said portion of the circuit is then transferred to the reactor at point (A).

When the circuit draining operations are completed, controller (50) initiates closure of the fluid supply valves (41), (42), (43) and closure of valve (15) downstream of the circuit. The circuit can then be isolated, for example for maintenance, or re-activated by re-starting pump (16) and opening valves (14) and (15). Advantageously, the connections for the slurry circuit to the reactor at points (A) and (B)

are inclined, as shown in FIG. 1, so that no solid from the slurry contained in the reactor can be deposited at the connections.

If the upstream portion of the circuit between point (A) and valve (14) is inclined, for example by at least 60° to the horizontal, then this portion of the circuit does not need to be drained as solid particles return to the reactor under gravity without adhering to the inclined walls.

In accordance with the invention, the reactor has a sufficient additional free volume (5) at the reactor head above the slurry level corresponding to normal operation of the reactor to accept the surplus slurry from circuit (11, 12, 13) during draining thereof and also the volume of pressurised liquid supplied to the circuit during draining. The free volume (gas) at the reactor head is larger than the volume of the liquid/solid slurry suspension initially contained in the circuit, including the separation section (17), during normal operation of the facility.

This free volume can advantageously be in the range 1.1 to 20 times the volume of the suspension in the circuit, preferably in the range 1.3 to 13 times this volume.

In accordance with the invention, it is not necessary for all of the operational faults of the facility to result in a shutdown of circulation and draining of the external slurry circuit. As an example, if slurry circulation pump (16) is duplicated and one of the two pumps breaks down, the other pump can be started by controller (50), the defective pump can be purged with the pressurised liquid using the process described above, and that defective pump can be isolated by closing the upstream and downstream valves, and the second pump will circulate the slurry.

Immediate automatic shutdown of circulation and compete draining of the slurry circuit are preferably reserved for major faults, in particular with non duplicated equipment located in the circuit itself, which require the circuit to be shut down.

Thus, the invention proposes, in combination, an assembly of technical means that can prevent clogging and/or blockages in slurry type reactor facilities, in particular to prevent problems in the difficult case when an operational fault occurs in the slurry circulation circuits. Thus, it can increase the reliability and reduce maintenance of facilities comprising a slurry reactor.

The invention claimed is:

1. A facility for chemically converting a feed, comprising:
   at least one reactor (2) containing a slurry comprising at least one suspension of at least one solid in a liquid,
   a gas supply located in the lower portion of said reactor,
   a circuit (11, 12, 13), external to said reactor, for continuous circulation of a slurry stream, said circuit comprising means for withdrawing said slurry stream from at least one point (A) of said reactor, means for reintroducing at least a portion of said slurry stream at at least one other point (B) of said reactor, and a separation section (17) for separating at least one fluid contained in said slurry stream traversing the external circuit (11, 12, 13), said facility further comprising:
   at least one block valve (14) for stopping circulation of said slurry stream in said circuit (11, 12, 13);
   means for introduction of at least one pressurized fluid at at least one point (D) of said circuit for draining slurry contained in said circuit;
   means (16) for circulating said slurry in said external circuit under conditions such that the Reynolds number is more than 2500 at every point in said external circuit (11, 12, 13),
   wherein said means for introduction of at least one pressurized fluid at at least one introduction point (D) is connected to a source of at least one pressurized fluid which is substantially free of solid in suspension and is at a pressure higher than that of point (D); and
   a free volume (5) is provided in the upper portion of the reactor (2) above the liquid/solid suspension, said free volume being greater than the total volume of the liquid/solid suspension contained in the circuit and in the separation section (17),
   said facility further comprising means for detecting at least one operational defect in said facility connected to means (50) for obtaining automatic immediate closure of said block valve (14), when said at least one operational defect is detected, and for subsequently automatically introducing pressurized fluid substantially free of solid in suspension by opening of at least one valve (41, 42, 43) thereby placing said circuit into communication with said source of pressurized fluid which is substantially free of solid in suspension via said means for introduction of at least one pressurized fluid at at least one point (D).

2. A facility according to claim 1, in which said at least one point (D) is between said at least one block valve (14) for stopping circulation of the slurry and said separation section (17).

3. A facility according to claim 1, wherein said means for introduction of at least one pressurized fluid is connected to a source of pressurized gas.

4. A facility according to claim 1, wherein said means for introduction of at least one pressurized fluid is connected to a source of pressurized liquid.

5. A facility according to claim 1, wherein said reactor (2) further comprises:
   means (6) for injecting said reactive gas at a plurality of points; and
   means for suspending and agitating the slurry in the reactor to avoid deposition of solid in the reactor (2) above the gas injection points.

6. A facility according to claim 1, wherein said means (16) for circulating slurry in said external circuit is of a size so that said Reynolds number of the slurry is in the range 2500 to 500000 at every point in said external circuit.

7. A facility according to claim 1, further comprising means for condensing at least a portion of the gaseous effluent from said reactor (2), and means (37) for storing at least a portion of the condensed effluent, wherein said storage means (37) is connected to means for introduction of at least one pressurized fluid at point (D) of said circuit.

8. A facility according to claim 1, wherein said solid in suspension is a reaction catalyst, and said pressurized fluid is a fluid that is chemically compatible with the catalyst.

9. A facility according to claim 1, wherein said means for introduction of at least one pressurized fluid introduces pressurized fluid at point (D) and point (C) of said circuit, wherein point (D) is downstream of said block valve (14) and point (C) is upstream of said block valve.

10. A facility according to claim 9, wherein said means for introduction points (D) and (C) are positioned at a distance from said block valve such that pressurized fluid introduced into the circuit at these points will permit at least 80% of the horizontal or slightly inclined potions of the circuit to be flushed.

11. A facility according to claim 1, further comprising a line for removing gaseous effluent from said reactor, a heat exchanger for condensing at least a portion of the gaseous effluent removed from said reactor, a first separation drum connected to said heat exchanger for separating a gas phase, a first liquid phase, and a second liquid phase from said gaseous effluent, and a line connecting said first separation drum to a second separation drum for delivering said second liquid phase to said second separation drum.

12. A facility according to claim 11, wherein said means for introduction of at least one pressurized fluid at at least one point (D) of said circuit comprises a line for removing a gaseous phase from said second separation drum which is connected to said circuit at point (D), and point (D) is positioned between said at least one block valve (14) and said separation section.

13. A facility according to claim 12, wherein said means for introduction of at least one pressurized fluid at at least one point (D) of said circuit further comprises a line for removing a liquid phase from said second separation drum which is connected to said circuit at point (C), and point (C) is positioned between said means for withdrawing said slurry stream from at least one point (A) of said reactor and said separation section.

14. A facility according to claim 13, wherein said means for introduction of at least one pressurized fluid at at least one point (D) of said circuit further comprises a line connected to said line for removing a liquid phase from said second separation drum which is connected to said line for removing a gaseous phase from said second separation drum which is connected to said circuit at point (D).

15. A facility according to claim 12, wherein said means for introduction of at least one pressurized fluid at at least one point (D) of said circuit further comprises a line for removing a liquid phase from said second separation drum which is connected to said line for removing a gaseous phase from said second separation drum which is connected to said circuit at point (D).

16. A facility according to claim 1, wherein said means (16) for circulating said slurry in said external circuit is positioned between said separation section and said means for reintroducing at least a portion of said slurry stream at point (B) of said reactor.

17. A facility for chemically converting a feed, comprising:
at least one reactor (2) containing a slurry comprising at least one suspension of at least one solid in a liquid;
a gas supply located in the lower portion of said reactor; and
a circuit (11, 12, 13), external to said reactor, for continuous circulation of a slurry stream, said circuit comprising:
a line for withdrawing said slurry stream from at least one point (A) of said reactor,
at least one block valve (14) on said circuit downstream of point (A) for stopping circulation of said slurry stream in said circuit,
means for introduction of at least one pressurized fluid at at least one point (D) of said circuit, said point (D) being downstream of said block valve,
a separation section (17), downstream of said point (D), for separating at least one fluid contained in said slurry stream traversing the external circuit,
a line for reintroducing at least a portion of said slurry stream at at least one other point (B) of said reactor, wherein point (B) is below point (A), and
means (16), downstream of said separation section (17) and upstream of point (B), for circulating said slurry in said external circuit from point (A) to point (B) under conditions such that the Reynolds number is more than 2500 at every point in said external circuit (11, 12, 13),
wherein said means for introduction of at least one pressurized fluid at at least one introduction point (D) is connected to a source of at least one pressurized fluid which is substantially free of solid in suspension and is at a pressure higher than that of point (D); and
a free volume (5) is provided in the upper portion of the reactor (2) above the liquid/solid suspension, said free volume being greater than the total volume of the liquid/solid suspension contained in the circuit and in the separation section (17),
said facility further comprising means for detecting at least one operational defect in said facility connected to means (50) for obtaining automatic immediate closure of said block valve (14), when said at least one operational defect is detected, and for subsequently automatically introducing pressurized fluid substantially free of solid in suspension by opening of at least one valve (41, 42, 43) thereby placing said circuit into communication with said source of pressurized fluid which is substantially free of solid in suspension via said means for introduction of at least one pressurized fluid at at least one point (D).

18. A facility according to claim 17, further comprising additional means for introduction of at least one pressurized fluid at at least one point (C) of said circuit, wherein point (C) is positioned between point (A) and said at least one block valve (14).

19. A facility according to claim 18, further comprising a line for removing gaseous effluent from said reactor, a heat exchanger for condensing at least a portion of the gaseous effluent removed from said reactor, a first separation means connected to said heat exchanger for separating a first gas phase, a first liquid phase, and a second liquid phase from said gaseous effluent, means for pressurizing said second liquid phase, a second separation means for separating the pressurized second liquid phase into a second gas phase and a third liquid phase, and a line for delivering said second gas phase to the external circuit at point (D).

20. A facility according to claim 19, further comprising a line for delivering said at least a portion of said third liquid phase to the external circuit at point (D).

21. A facility according to claim 20, further comprising a line for delivering said at least a portion of said third liquid phase to the external circuit at point (C).

22. A facility according to claim 21, further comprising:
a first control valve (41) on said line for delivering said second gas phase to the external circuit at point (D);
a second control valve (42) on said line for delivering said at least a portion of said third liquid phase to the external circuit at point (D);
a third control valve (43) on said line for delivering said at least a portion of said third liquid phase to the external circuit at point (C); and
control means (50) for controlling closure of the block valve (14) and for controlling said first, second and third control valves (41, 42, 43) and controlling fluid communication between said circuit and a source of pressurized fluid which is substantially free of solid in suspension.

23. A facility according to claim 17, further comprising a line for removing gaseous effluent from said reactor, a heat exchanger for condensing at least a portion of the gaseous effluent removed from said reactor, a first separation means connected to said heat exchanger for separating a first gas phase, a first liquid phase, and a second liquid phase from said gaseous effluent, means for pressurizing said second liquid phase, a second separation means for separating the pressurized second liquid phase into a second gas phase and a third liquid phase, and a line for delivering said second gas phase to the external circuit at point (D).

24. A facility according to claim 23, further comprising a line for delivering said at least a portion of said third liquid phase to the external circuit at point (D).

* * * * *

UNITED STATES PATENT AND TRADEMARK OFFICE
CERTIFICATE OF CORRECTION

PATENT NO. : 7,125,524 B2 Page 1 of 1
APPLICATION NO. : 10/481818
DATED : October 24, 2006
INVENTOR(S) : Jean-Marc Schweitzer et al.

It is certified that error appears in the above-identified patent and that said Letters Patent is hereby corrected as shown below:

Column 10, line 62, reads "inclined potions" should read -- inclined portions --.

Signed and Sealed this

Fourteenth Day of August, 2007

JON W. DUDAS
*Director of the United States Patent and Trademark Office*